United States Patent [19]

Okita et al.

[11] 4,228,476
[45] Oct. 14, 1980

[54] PROTECTIVE RELAYING SYSTEM

[75] Inventors: Yuji Okita, Chofu; Ryotaro Kondo, Fuchu; Yoshiji Nii, Kawaguchi, all of Japan

[73] Assignees: Tokyo Shibaura Denki Kabushiki Kaisha, Kanagawa; Tokyo Denryoki Kabushiki Kaisha, Tokyo, both of Japan; part interest to each

[21] Appl. No.: 915,231

[22] Filed: Jun. 13, 1978

[30] Foreign Application Priority Data

Jun. 13, 1977 [JP] Japan .................. 52-68942

[51] Int. Cl.² .................. H02H 3/28; H02H 7/26
[52] U.S. Cl. .................. 361/68; 361/82; 364/492; 364/483
[58] Field of Search .................. 361/68, 67, 79, 80, 361/81, 82, 83, 84; 364/107, 111, 480, 481, 482, 483; 235/302.1, 302.2, 303, 303.2; 340/146.1 R, 146.1 AX, 146.1 AV, 146.1 AG

[56] References Cited

U.S. PATENT DOCUMENTS

| | | | |
|---|---|---|---|
| 3,569,785 | 3/1971 | Durbeck et al. .................. | 361/80 |
| 3,643,027 | 2/1972 | Goldberg .................. | 340/146.1 AX X |
| 3,646,517 | 2/1972 | Waters et al. .................. | 340/146.1 AX |
| 3,721,959 | 3/1973 | George .................. | 340/146.1 AX |
| 3,790,769 | 2/1974 | Ziegler .................. | 340/146.1 AX X |
| 3,984,737 | 10/1976 | Okamura et al. .................. | 361/80 |
| 4,038,636 | 7/1977 | Doland .................. | 340/146.1 AV |
| 4,061,997 | 12/1977 | Niethammer et al. .................. | 340/146.1 AX |
| 4,071,873 | 1/1978 | Andow et al. .................. | 361/68 X |
| 4,091,239 | 5/1978 | Lainey et al. .................. | 340/146.1 AV X |
| 4,091,240 | 5/1978 | Lainey et al. .................. | 340/146.1 AV X |
| 4,107,778 | 8/1978 | Nii et al. .................. | 361/80 X |

Primary Examiner—Patrick R. Salce
Attorney, Agent, or Firm—Stevens, Davis, Miller & Mosher

[57] ABSTRACT

In a protective system which operates in response to a plurality of state quantities, for example voltage and current, one of which being a digital code signal having a long code length and transmitted over a transmission circuit, the density of the code errors of the digital code signal is detected. A plurality of state quantities are processed by a processor including first means responsive to the digital code signal and second means not responsive to the digital code signal. Either one of the first and second means is selected according to the density of the code errors.

7 Claims, 7 Drawing Figures

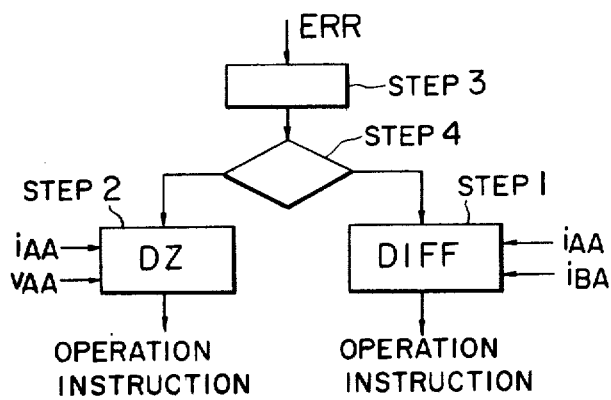
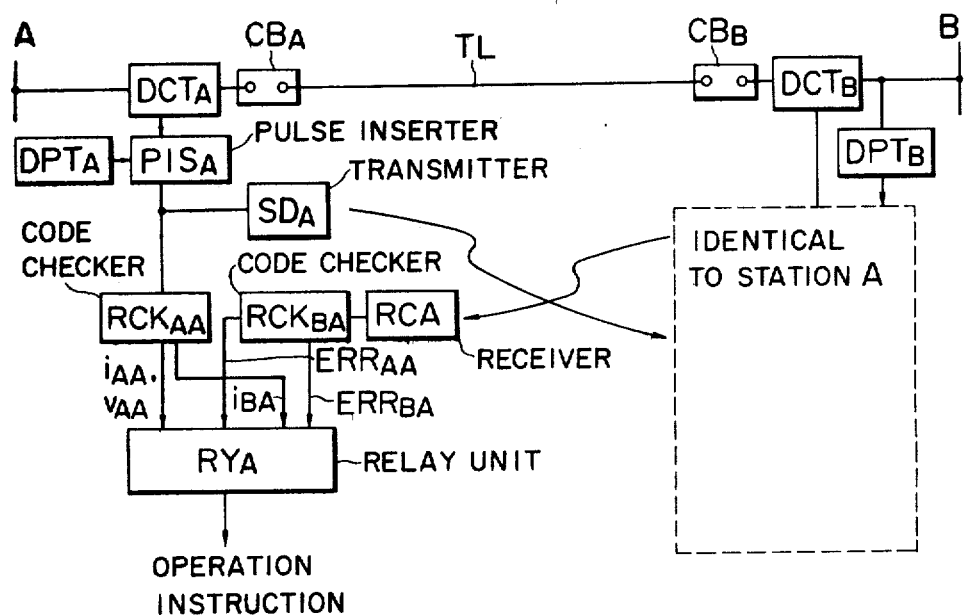

PROTECTIVE RELAYING SYSTEM

BACKGROUND OF THE INVENTION

This invention relates to a protective relaying system of an electric power transmission line capable of operating at a high reliability by transmitting and processing data having a relatively long code length, more particularly a protective relaying system wherein electric quantities at respective terminals of a transmission line are transmitted as encoded digital signals and arithmetically operated so as to protect the transmission line.

FIG. 1 is a block diagram of a protective relaying system to which the invention is applicable in which electric stations A and B are interconnected by a transmission line TL including circuit breakers $CB_A$ and $CB_B$ and current transformers $CT_A$ and $CT_B$. The relaying system comprises relay units $RY_A$ and $RY_B$, analogue-digital converters (A/D converter) $AD_A$ and $AB_B$ respectively connected between current transformers $CT_A$, $CT_B$ and relay units $RY_A$, $RY_B$, transmitters $SD_A$ and $SD_B$ respectively connected to the outputs of A/D converters and receivers $RC_A$ and $RC_B$ respectively connected to relay units $RY_A$ and $RY_B$.

The secondary current $I_A$ of current transformer $CT_A$ at station A is converted into a digital quantity $i_{AA}$ by A/D converter $AD_A$. A portion of the digital quantity $i_{AA}$ is supplied to the relay unit $RY_A$ of station A whereas the other portion is modulated, for example by PCM (pulse code modulation), in the transmitter $SD_A$ and then sent to the other station B as a modulated signal $S_A$. In station B, this signal is demodulated by a receiver $RC_B$ to produce a signal $i_{AB}$ which is supplied to relay unit $RY_B$ together with a digital signal $i_{BB}$ obtained by converting the secondary current $I_B$ of current transformer $CT_B$ by D/A converter $AD_B$, thus effecting differential protection of the transmission line with digital quantities.

Suppose now that current normally flows from station A to station B. Then, so long as the vector sum of currents $I_A$ and $I_B$ is zero the differential relaying system would not operate. However, when the vector sum exceeds a predetermined value, the relay units operates to trip both circuit breakers $CB_A$ and $CB_B$. With this construction, when the transmitted signal $S_A$ is affected by such disturbance of the transmission line as noise, the demodulated output $i_{AB}$ would no more correspond to current $I_A$, thus causing the relay to misoperate. To overcome this difficulty, it is usual to prevent such misoperation of the relay unit by detecting an abnormal condition of the transmitted signal.

There are the following methods of detecting the abnormal condition:

1. To make long the transmitted code signal by adding a parity code thereto so as to detect code errors.
2. Code errors are detected or corrected by using such long code as a hamming code.
3. To repeat the digital arithmetic operation at the relay unit for producing an operation instruction when a definite operating condition is continuously satisfied for more than a predetermined times, for example 3.

Under normal operating conditions, a single or "one shot" disturbance occurs randomly on a transmission line, but when a radio repeating office is constructed or repaired or when fading occurs due to unstable atmospheric conditions, the condition of the transmission line would become worse in a short time. However, such worse condition occurs scarecely.

In a protective relaying system utilizing a digital arithmetic operation, judgment of the fault is usually made by using a number of time series signals $i_{AB}(i_{AB}(t), i_{AB}(t+\Delta t)\ldots,)$ where t represents time and $\Delta t$ a time step, the adverse effect upon the transmitted signal persists a long time. To overcome this difficulty, when the condition of the transmission line becomes worse it has been the practice to increase the lock time of the relay when a code error is detected by the above described method 1 or 2 or to increase the number of repetitions in method 3, for the purpose of preventing misoperation of the relay. Each of these measures prevents high speed operation of the relay under favorable conditions of the transmission line. When the condition of the transmission line becomes an extremely worst condition and code errors occurs in a burst it has been difficult to avoid the effect of such adverse condition even with a long lock time.

SUMMARY OF THE INVENTION

It is an object of this invention to provide an improved protective relaying system of the digital type capable of eliminating various difficulties of the prior art relaying systems.

Another object of this invention is to provide an improved protective relaying system capable of operating at a high speed regardless of the condition of the transmission line.

According to this invention, there is provided a protective relaying system of an electric power transmission line between first and second stations comprising: means installed in each station for detecting an analoge electric quantity of said transmission line, means installed in the second station for converting the analogue electric quantity into a digital electric quantity, means installed in the second station for encoding the digital electric quantity, means installed in the second station for increasing the code length of the encoded digital electric quantity, means installed in the second station for transmitting the encoded digital electric quantity having an increased length toward the first station, an error detector installed in the first station for detecting the density of errors of the encoded digital electric quantity which occur during transmission thereof to produce an error signal, processing means installed in the first station for arithmetically operating a plurality of the electric quantities to produce an operation instruction, said processing means including first means responsive to the digital electric quantity and second means not responsive to the digital electric quantity, and means for controlling the processing means in response to the error signal.

BRIEF DESCRIPTION OF THE DRAWINGS

In the accompanying drawings:

FIG. 3 is a flow chart showing the program steps utilized in the protective relaying system shown in FIG. 2;

FIGS. 4 and 5 are block diagrams showing still another embodiments of this invention;

DESCRIPTION OF THE PREFERRED EMBODIMENTS

Figure 1:
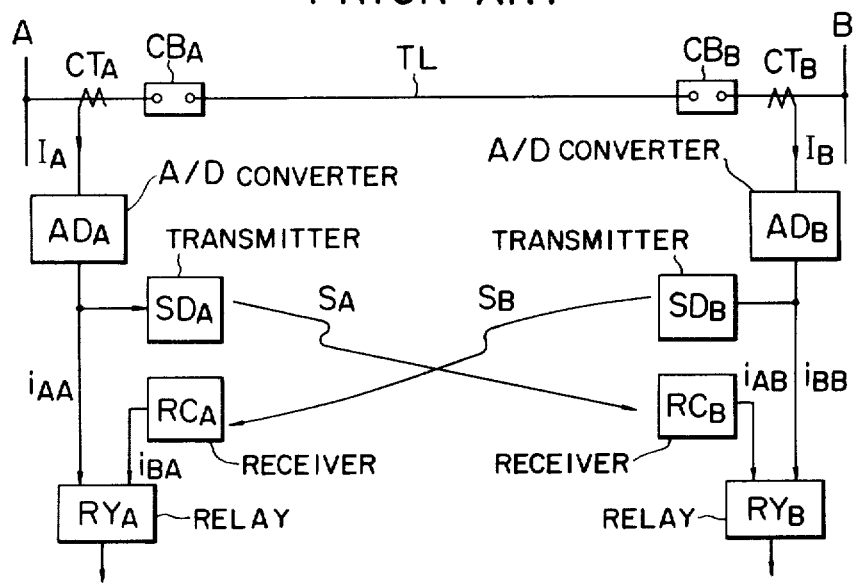
FIG. 1 is a block diagram showing a protective relaying system to which the invention is applicable.
Figure 2:
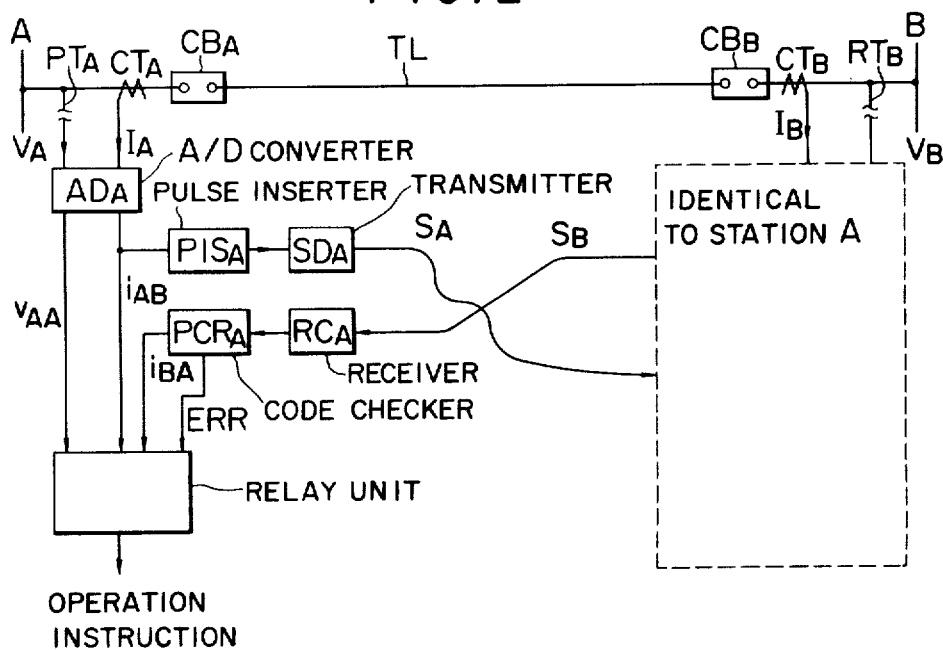
FIG. 2 is a block diagram showing a preferred embodiment of the protective relaying system according to this invention.

Referring now to FIG. 2, the secondary current $I_A$ of a current transformer $CT_A$ connected to a transmission line TL to be protected and located in station A is converted into a digital quantity $i_{AA}$ by an D/A converter $AD_A$ and the secondary voltage $V_A$ of a potential transformer $PT_A$ in the same station is also converted in a digital quantity $v_{AA}$ by the same A/D converter. In FIG. 2, suffixes A and B represent stations A and B. Where two suffixes are used, the first suffix represents a station where the signal is produced, whereas the second suffix represents a station in which the signal is used. For example, $i_{AA}$ represents a current signal generated and used in station A whereas $i_{BA}$ represents a current signal generated in station B but used in station A. If desired, the A/D converter $AD_A$ may be provided with such functions or elements as converting an input signal into a voltage signal having a necessary level, a filter, an amplitude limiter, a sample for sampling respective phase current, and an encoder which converts a digital quantity into a series of digital codes. Where an encoder is provided, the digital quantity $i_{AA}$ comprises a digital code which is applied to a pulse inserter $PIS_A$ where the length of the code is increased by adding a check pulse. Then, the code signal is modulated by a transmitter $SD_A$ into a signal $S_A$ which is transmitted to station B over the transmission line TL. Signal $S_B$ sent from station B to station A in the same manner as above described is demodulated by receiver $RC_A$. The presence and absence of a code error in the received signal is checked by a code checker $PCR_A$ and converted into a digital code signal $i_{BA}$ corresponding to the secondary current $I_B$ of a current transformer $CT_B$ installed in station B. The digital code signals $i_{AA}$ and $i_{BA}$ are applied to a differential relay $RY_A$ which operates by using an arithmetic operation. When a code error is detected by the code checker $PCR_A$, an error signal ERR is sent to the relay $RY_A$. The protective relay installed in station B has the same construction.

FIG. 3 shows a flow chart showing the program steps for digitally processing various signals at the relay $RY_A$. At step 1, code signals $i_{AA}$ and $i_{BA}$ corresponding to the currents at respective stations are used to perform an arithmetic operation necessary for the differential protection and when a predetermined operating condition is fulfilled an operating instruction is produced. Code signals $i_{AA}$ and $v_{AA}$ representing the current and voltage in station A are utilized at step 2 to perform an arithmetic operation for the distance protection and when a predetermined operating condition is fulfilled an operating instruction is produced. The routines for executing steps 1 and 2 are controlled by step 4 as will be described later. When an error in the transmitted signal $S_A$ is detected by the code checker $RCK_A$, an error signal ERR is applied to step 3 where the number of errors detected in a unit time, that is the density of error is detected. At step 4, in response to the detected error density, a judgment is made as to whether the arithmetic operation made at step 1 based on the digital code signal transmitted over the transmission line is useful or not so as to transfer the execution routines to steps 1 and 2. A compensation for the time required by the current signal $I_B$ in station B to reach station A to be used as the digital code signal $i_{BA}$ in station A, that is the so-called transmission delay time compensation may be made at step 1 by a program logic or a hard wired logic or any other well known expedient.

It has been well known to digitally transmit current informations of a transmission line, and to detect code errors by increasing the length of the digital code at the time of transmission and the incrrease in the code length and the detection of the code error can be made by either one of the following well known methods, a. to detect a single code error by a parity check, b. to detect or correct the code error by a hamming code c. to detect or correct by cyclic redundancy code (CRC) check.

The operation judgement of a protective relay can be made by a program logic by using a microcomputer or a minicomputer, as is well known in the art.

Accordingly, only the operations which are provided by the program steps shown in FIG. 3 will be described hereunder. As above described, at step 1, a differential protection arithmetic operation is executed which can be accomplished by digitally operating and judging a well known operation condition equation of a differential relay.

$$I_A + I_B - k(|I_A| + |I_B|) > k_O$$

(where K and $K_0$ are constants) by using digital code signals $i_{AA}$ and $i_{BA}$ respectively corresponding to currents $I_A$ and $I_B$. The arithmetic operation in station A at a time t is executed by using digital code signals $$i_{AA}(t), i_{AA}(t-\Delta t), i_{AA}(t-2\Delta t)$$

$$i_{BA}(t), i_{BA}(t-\Delta t), i_{BA}(t-2\Delta t)$$

which correspond to currents $I_A$ and $I_B$ at times, t, $t-\Delta t$, $t-2\Delta t$—respectively, where $\Delta t$ respresents a predetermined time step. In the same manner, at step 2, the distance protection arithmetic operation is executed by using code signals $i_{AA}$ and $v_{AA}$. Accordingly, when the code signal $i_{BA}(t)$ is rendered erroneous due to a disturbance on the transmission line, the result of operations at step 1 would be erroneous not only at time t but also at times, $t+\Delta t$, $t+2\Delta t$ and so on although the error in the code signal $i_{BA}(t)$ is detcted by the code detector $RCK_A$. For example, when the arithmetic operation at time t is made based on the data at times t, $t-\Delta t$ and $t-2\Delta t$, the results of operations at times t, $t+\Delta t$ and $t+2\Delta t$ are also rendered erroneous by the error in code signal $i_{BA}(t)$. Accordingly, it is possible to positively prevent the relay unit from misoperating by controlling the number of repeating the distance protection arithmetic operations based on the fact that a code error has been detected once.

When the code error occurs as an "one-shot" error such error can be detected at a high probability by adding a parity code or a hamming code as above described. Most errors occurring under normal operation condition are of such "one shot" type. However, where some manual work is done in a radio repeating office along the transmission line or where fading occurs due to unstable condition of the atmosphere, the percentage of code error increases greatly so that it becomes impossible to accurately detect the code errors by the addition of the parity code or the hamming code. In such case, the reliability of the result of differential protection arithmetic operation at step 1 decreases. On the other hand, since the distance protection arithmetic operation made at step 2 does not utilize any digital signal transmitted over the transmission line it is possible to continue accurate calculation. In such case, however, the number of errors detected in unit time increases greatly. In response to the error signal ERR, the detereoration of the transmission condition is detected at step 3 by checking the number of errors which have been detected or corrected in unit time, that is by calculating the density of the detected errors. At step 4, a program step to be executed next is determined based on the detected density. That is, when the density of the detected error is higher than a predetermined value step 2 is executed, whereas where the density is lower than the predetermined value step 1 is executed to perform the arithmetic operation for protection.

As can be noted from the foregoing description concerning FIGS. 2 and 3, according to this invention, when the density of the detected error is small, that is when code error does not occur frequently during transmission, the protection is performed by using the current differential protection arithmetic operation which has the highest fault identifying ability, whereas when error occurs frequently (high error density) during transmission, the protection is switched to the protection based on the distance protection arithmetic operation which is not necessary to use a current information transmitted over the transmission line. The equation of distance protection is expressed by $$[K_1 V_A I_A (\cos \theta - \phi) - K_2 V A^2] > K_0$$

where
$K_1$, $K_2$ and $K_0$ are constants,
$\Phi$ is a set angle (maximum sensitivity angle)
$\theta$ is an angle between $V_A$ and $I_A$ Accordingly, it is possible to provide a protective relaying system capable of operating at a high reliability without lowering the protective accuracy (delayed response or misoperation) even when error occurs frequently. For this reason it is not necessary to use any lock mechanism or lock program that locks the relay for a definite time when a code error is detected as in the prior art.

In the foregoing, differential current protection of a two terminal transmission line has been described. It is to be understood that the invention is also applicable to multi-terminal transmission lines and to a voltage phase comparison type protective system utilizing voltage informations instead of current informations. The invention is also applicable to a so-called central judging type relay system in which an operation judging elements are provided for only one end and the other end is equipted with elements which transmit informations at the other end.

Instead of analogue type current and potential transformers shown in the drawing, digital type current and potential transformers can also be used as shown in FIG. 4, in which the current and voltage in station A are converted directly into digital codes by digital current transformer $DCT_A$ and digital potential transformer $DPT_A$. A pulse inserter $PIS_A$ and a code checker $RCK_{AA}$ are connected on the output sides of the digital current transformer and digital potential transformer whereas a code checker $RCK_{BA}$ is connected in series with the receiver RCA for checking the code signals sent from the other station B, thereby detecting code errors of all code signals generated in both stations. With this construction, it is possible to supervize whether the density of the code error outputs of the code checker $RCK_{AA}$ in station A exceeds a predetermined value or not.

With reference to FIG. 3 it has been stated that either one of the protective arithmetic operation steps is selected in accordance with the detected error density. In an important power system it is usual to use a normal protection and a back-up protection for improving the accuracy of protection. Accordingly, the distance relay arithmetic operation performed at step 2 in FIG. 3 may also provide a back-up protection. To this end, the step 2 is programmed to produce a trip instruction for the circuit interrupters after a predetermined time when the normal protective system does not respond to a fault in a section to be protected. However, when the condition of the transmission circuit is not good so that it is impossible to except accurate and rapid differential protective operation at step 1 the section is protected at one without any time delay.

Furthermore, in the foregoing description it was assumed that distance protection is effected at step 2 shown in FIG. 3. But any type of protection which utilizes information signals of only one end may be made at step 2. As is well known, a power directional relay is used for the back-up protection of a ground fault of a power system grounded through a high resistance. In such installation step 2 is used to effect power directional protection. It is well known in the art to execute power directional protection arithmetic operation by a program logic. The equation of power directional protect is as follows.

$$KV_A \cdot I_A \cos (\theta - \phi) > K_0$$

where K, $K_0$, $\theta$ and $\phi$ have the meanings as above defined.

In all embodiments described above, protective abilities of the relaying system were calculated by digital operations. However, the invention is not limited to such arrangement. For example, the distance protection arithmetic operation at step 2, FIG. 3, can be substituted by an analogue relay system.

Figure 5:
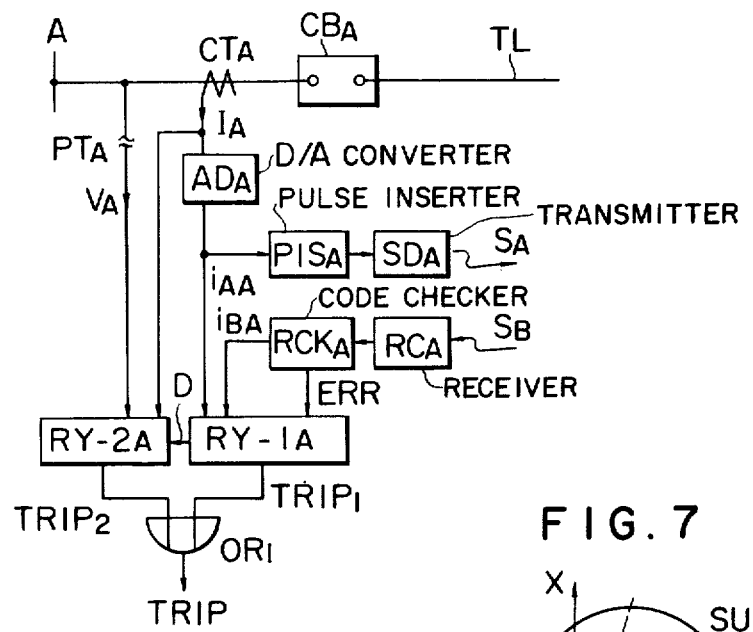
Figure 7:
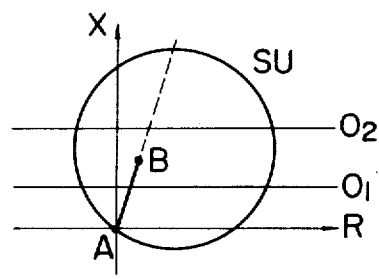
FIG. 7 shows the protective characteristic of the relay shown in FIG. 6.
Figure 6:
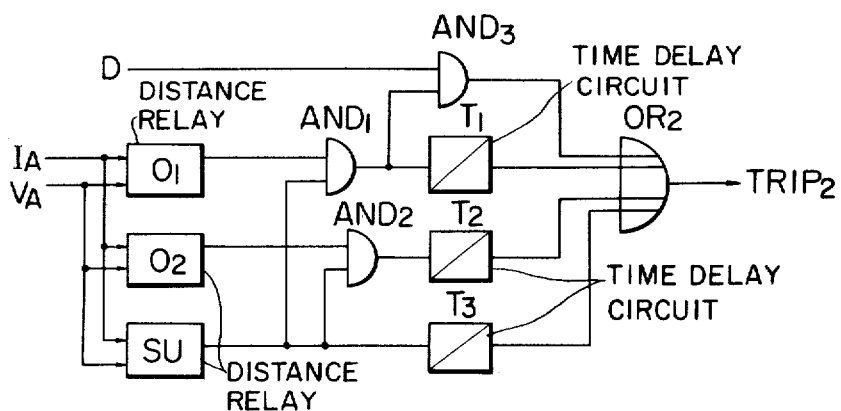
FIG. 6 is a connection diagram showing an analogue relay utilized in the embodiment shown in FIG. 5.

FIG. 5 is a block system showing such modified embodiment, and FIG. 6 is a connection diagram of an analogue relay unit utilized in the embodiment shown in FIG. 5. The protective characteristic of the relay unit shown in FIG. 6 is shown in FIG. 7. In FIG. 5 only the elements installed in station A are shown and the elements corresponding to those shown in FIG. 2. are designated by the same reference characters. There are provided a digital relay device $RY-1_A$ which calculates the density of the detected error and produces an instruction $TRIP_1$ for performing differential protection when the error density is less than a predetermined value but produces a control signal D when the error density is higher than the predetermined value, and an analogue relay device $RY-2_A$ having a construction shown in FIG. 6 and connected to receive current $I_A$ and voltage $V_A$ of station A and the control signal D for producing an instruction $TRIP_2$. Instructions $TRIP_1$ and $TRIP_2$ are applied to an OR gate circuit $OR_1$ to obtain a trip signal for the circuit breaker $CB_A$ in station A.

As shown in FIG. 6, the relay unit $RY-2_A$ comprises three distance relays $O_1$, $O_2$ and SU, each having a protective characteristic as shown in FIG. 7 and energized by $I_A$ and $V_A$. When relays $O_1$ and SU operate concurrently, an AND gate circuit $AND_1$ is enabled to produce instruction $TRIP_2$ via an OR gate circuit $OR_2$ and a time delay circuit $T_1$ which provides a first stage back-up time. The second and third back-up times are similarly provided by time delay circuits $T_2$ and $T_3$ having different delay times. The outputs of the AND gate circuit $AND_1$ and the control signal D are applied to an AND gate circuit $A_3$ so that when distance relays $O_1$ and SU operate simultaneously, the fault in the protected section can be protected at once even when the condition of the transmission line is not good. Thus, this modification too has a high reliability.

As can be noted from the foregoing description, the invention is applicable to any protective system so long as it comprises a system to be protected, means for detecting an operating state thereof as a digital information, means for transmitting the digital information as an elongated code signal, and means for determing an operating state being protected by processing a plurality of digital information signals.

Thus, according to this invention, it is possible to protect an electric power system at a high speed and accuracy without being affected by code errors of electric signals representing the operating state of the system, and to modify the extent of protection depending upon the degree or frequency of the code error. Moreover, it is possible to supervize the operating condition of the power system. Further, different from prior art systems, it is not necessary to use means for locking the relaying system for a definite time when a code error is detected.

We claim:

1. A protective relaying system of an electric power transmission line between first and second stations comprising:
   means installed in each station for detecting an analogue electric quantity of said transmission line,
   means installed in said second station for converting the analogue electric quantity into a digital electric quantity,
   means installed in said second station for encoding said digital electric quantity,
   means installed in said second station for increasing the code length of the encoded digital electric quantity,
   means installed in said second station for transmitting said encoded digital electric quantity having an increased length toward said first station,
   an error detector installed in said first station for detecting the density of errors of said encoded digital electric quantity which occur during transmission thereof to produce an error signal,
   processing means installed in said first station for arithmetically operating a plurality of said electric quantities to produce an operation instruction,
   said processing means including first means responsive to said digital electric quantity and second means not responsive to said digital electric quantity and
   means for controlling said processing means in response to said error signal.

2. The protective relaying system according to claim 1 wherein said first means of said processing means calculates the following equation to provide a differential protection of said transmission line $$I_A + I_B - k(|I_A| + |I_B|) > k_0$$

where $k$ and $k_0$ are constants and $I_A$ and $I_B$ are currents in said first and second stations.

3. The protective relaying system according to claim 1 wherein said second means of said processing means operates according to an equation $$[K_1 V_A T_A \cos(\theta - \phi) - K_2 V_A^2] > K_0$$

where $K_1$, $K_2$ and $K_2$ represent constants, $\phi$ a set angle and $\theta$ and angle between $V_A$ and $I_A$.

4. The protective relaying system according to claim 1 wherein said second means of said processing means provides a power directional protection based on an equation $$K V_A I_A \cos(\theta - \phi) > K_0$$

where $K$, $K_0$, $\theta$ and $\phi$ have the same meaning as defined in claim 3.

5. A protective relaying system of an electric power transmission line between first and second stations, wherein each station comprises:
   a digital current transformer, and a digital potential transformer for producing digital current and voltage code signals,
   means for increasing the code lengths of said digital current and voltage code signals,
   a first code checker for checking code errors of said digital current and voltage code signals, for producing a first error signal,
   a transmitter for transmitting said digital current and voltage code signals having increased code length to the other station,
   a second code checker for checking code errors of the digital current and voltage code signals transmitted from the other station for producing a second error signal,
   processing means responsive to said current and voltage signals for producing an operation instruction, and means responsive to said first and second error signals for controlling said processing means.

6. A protective relaying system of an electric power transmission line between first and second stations, wherein each station comprises,
   a potential transformer for producing an analogue voltage signal,
   a current transformer for producing an analogue current signal,
   an analogue-digital converter for converting said analogue current signal into a digital current signal,
   means for increasing the code length of said digital current signal,
   means for transmitting the digital current signal having an increased code length to the other station,
   means for detecting code errors of a digital current signal transmitted from said other station for producing an error signal,
   digital relay means responsive to the digital current signals of said first and second stations and said error signal to provide a differential protection when an error density detected by said code error detector is less than a predetermined value, but to produce a control signal when the error density is higher than said predetermined value, analogue relay means responsive to said analogue voltage and current signals and said control signal and an OR gate circuit responsive to the outputs of said first and second relay units for producing a trip signal.

7. The protective relaying system according to claim 6 wherein said second relay means comprises first, second and third distance relays each connected to receive analogue current and voltage signals, a first AND gate circuit connected to receive the outputs of said first and third distance relays, a second AND gate circuit connected to receive the outputs of said second and third distance relays, a third AND gate circuit connected to receive said control signal and the output of said first AND gate circuit, first, second and third time delay circuits respectively having different delay times and connected to the outputs of said first and second AND gate circuits and said third distance relay, and an OR gate circuit having inputs connected to receive the outputs of said first to third time delay circuits and the outputs of said third AND gate circuit respectively thereby providing back-up distance protection of said transmission line.

* * * * *